(12) United States Patent
Kwak et al.

(10) Patent No.: US 11,590,823 B2
(45) Date of Patent: Feb. 28, 2023

(54) VEHICLE AND CONTROL METHOD OF VEHICLE

(71) Applicants: Hyundai Motor Company, Seoul (KR); Kia Motors Corporation, Seoul (KR)

(72) Inventors: Jungmo Kwak, Gunpo-si (KR); Dong Won Yeon, Daejeon (KR); Myung Jun Kim, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 513 days.

(21) Appl. No.: 16/749,152

(22) Filed: Jan. 22, 2020

(65) Prior Publication Data
US 2021/0039473 A1 Feb. 11, 2021

(30) Foreign Application Priority Data
Aug. 5, 2019 (KR) .................. 10-2019-0094825

(51) Int. Cl.
*B60H 1/00* (2006.01)
*B60K 37/00* (2006.01)
*G06F 3/04883* (2022.01)

(52) U.S. Cl.
CPC ....... *B60H 1/00842* (2013.01); *B60H 1/0065* (2013.01); *B60H 1/00985* (2013.01); *B60K 37/00* (2013.01); *G06F 3/04883* (2013.01); *B60K 2370/115* (2019.05)

(58) Field of Classification Search
CPC .............. B60H 1/00842; B60H 1/0065; B60H 1/00985; B60K 37/00; B60K 2370/115
See application file for complete search history.

(56) References Cited

U.S. PATENT DOCUMENTS

| | | | |
|---|---|---|---|
| 2012/0330507 A1* | 12/2012 | Auner | B60H 1/00985 701/36 |
| 2015/0061841 A1* | 3/2015 | Lee | G08C 23/04 340/12.5 |
| 2016/0357262 A1* | 12/2016 | Ansari | G08G 1/166 |
| 2017/0220114 A1* | 8/2017 | Iino | G06F 3/04883 |
| 2018/0129409 A1* | 5/2018 | Lim | G06F 3/04845 |
| 2021/0048213 A1* | 2/2021 | Albrecht-Buehler | B60K 37/06 |

FOREIGN PATENT DOCUMENTS

| | | | | |
|---|---|---|---|---|
| EP | 3088220 A2 | * 11/2016 | ........... | B60H 1/0065 |
| EP | 2885142 B1 | * 11/2019 | ........... | B60H 1/0065 |
| JP | H05313818 A | 11/1993 | | |
| KR | 20180051002 A | 5/2018 | | |

* cited by examiner

*Primary Examiner* — Nelson J Nieves
(74) *Attorney, Agent, or Firm* — Slater Matsil, LLP

(57) ABSTRACT

In accordance with an aspect of the disclosure, a vehicle includes an air conditioning device. An input device is provided to receive a selection input of a user with respect to a blowing position of the air conditioning device and including a first input area, a second input area and a third input area for outputting an activation mark or a deactivation mark by the selection input, A controller is configured to control output of an activation mark or a deactivation mark of the first input area, the second input area and the third input area.

20 Claims, 7 Drawing Sheets

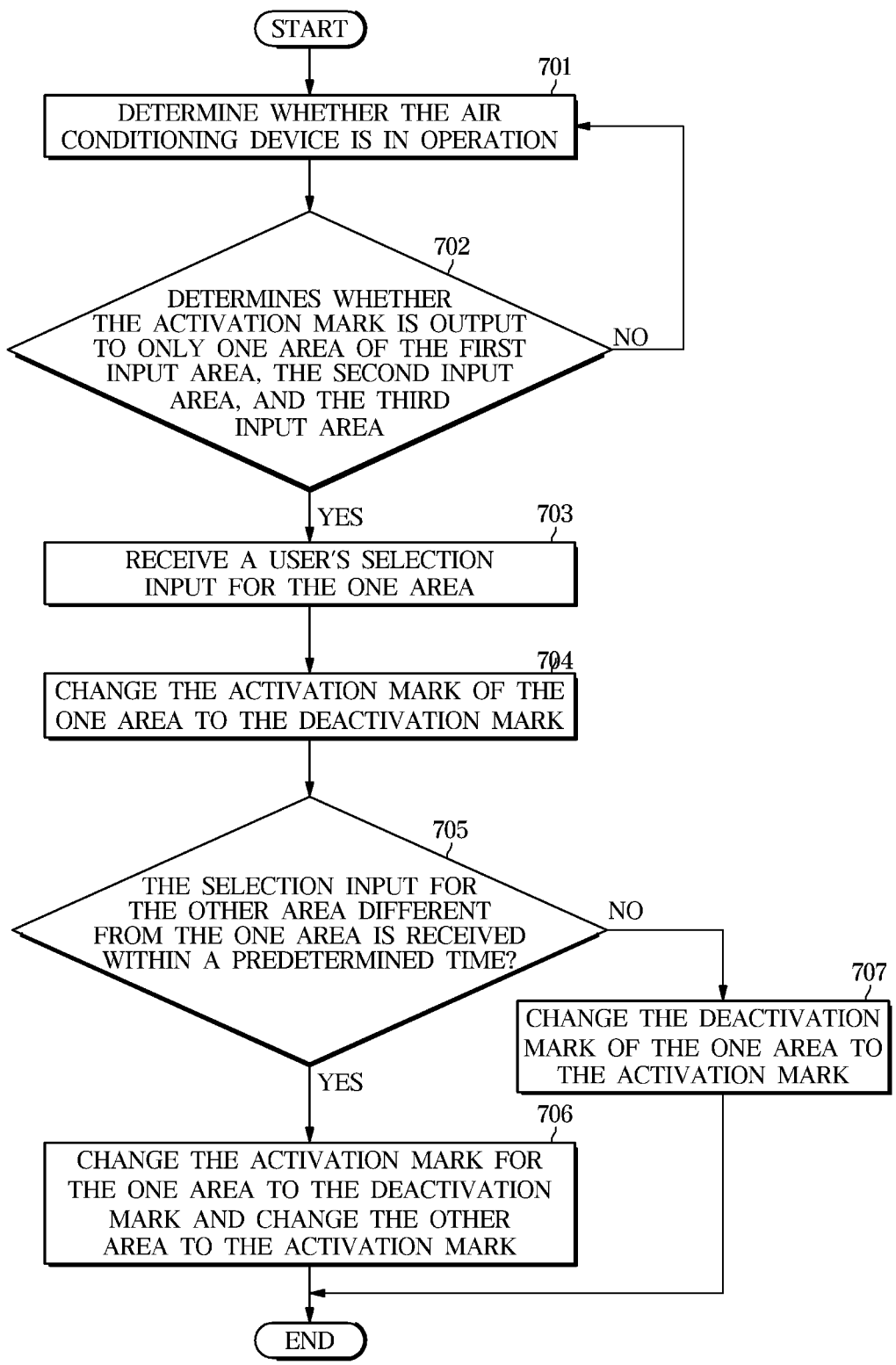

VEHICLE AND CONTROL METHOD OF VEHICLE

CROSS-REFERENCE TO RELATED APPLICATIONS

This application claims priority to Korean Patent Application No. 10-2019-0094825, filed in the Korean Intellectual Property Office on Aug. 5, 2019, which application is hereby incorporated herein by reference.

TECHNICAL FIELD

The disclosure relates to a vehicle and a control method of the vehicle.

BACKGROUND

A vehicle is typically equipped with an air conditioning device for comfortably maintaining the air environment according to various changes of the surroundings. The air conditioning device includes a cooling device for maintaining a low temperature and a heating device for maintaining a high temperature.

The air conditioning device is connected to the input/output means to be operated by the user. Referring to FIG. 1, the input device 10, which is an input/output means, includes a first push button 101, a second push button 102, and a third push button 103, thereby allowing a user to select a blowing position generated by an air conditioning device. For example, the user may control the air to be blown to the upper layer inside the vehicle through an input to the first push button 101.

On the other hand, when the user wants to change the position of the blower using a plurality of push buttons provided in the input device 10, the user intuitively presses a push button (for example, a first push button) corresponding to the blowhole currently in operation. Then, the push button (e.g., second push button) corresponding to the blowhole to be changed is pressed. However, since the air conditioning device requires air discharge by at least one blowhole when in operation, the activation mark of the first push button and the blowhole currently in operation are maintained. Due to the characteristics of the air conditioning device, a user may misunderstand that the input device has failed.

SUMMARY

The disclosure relates to a vehicle and a control method of the vehicle. Embodiments of the disclosed invention relate to a user interface for operating an air conditioning device in a vehicle.

An aspect of the disclosure provides a vehicle and a control method of the vehicle that provide a user interface for allowing a user to intuitively control the air conditioning device.

In accordance with an aspect of the disclosure, a vehicle includes an air conditioning device and an input device provided to receive a selection input of a user with respect to a blowing position of the air conditioning device and including a first input area and a second input area for outputting an activation mark or a deactivation mark by the selection input. A controller is configured to control output of an activation mark or a deactivation mark of the first input area and the second input area, in a state in which the air conditioning device is in an operating state and the activation mark of one of the first input area and the second input area is being output. The controller is configured to change the activation mark to the deactivation mark for a predetermined time when detecting the selection input for the one area of the user and control to maintain the blowhole operation of the air conditioning device corresponding to the one area.

The input device further includes a third input area, when a selection input for an other area different from the one area among the first input area, the second input area and the third input area is detected within the predetermined time, wherein the controller is configured to control the other area to output the activation mark, stop the blowhole operation of the air conditioning device corresponding to the one area and control to start the blowhole operation of the air conditioning device corresponding to the other area.

The input device further includes a third input area, when a selection input for an other area different from the one area among the first input area, the second input area and the third input area is not detected from the user within the predetermined time, wherein the controller is configured to control the output of the one area to change from the deactivation mark to the activation mark.

The input device further includes a third input area, Wherein the air conditioning device comprises a first blowhole, a second blowhole and a third blowhole, and the first blowhole, the second blowhole, and the third blowhole are different in arrangement depending on the height of the inside of the vehicle.

The input device further includes a third input area, the first input area, the second input area and the third input area are provided by a first push button, a second push button and a third push button, respectively, and the first push button, the second push button and the third push button include a light emitter to output an activation mark or a deactivation mark.

The input device is a touch display, and the touch display is configured to provide an area in which the first input area and the second input area are divided.

The touch display further includes a third input area and outputs a side of a seat to a partial area on the screen of the touch display, and the first input area is output as a first arrow pointing towards the top of the seat, the second input area is output as a second arrow pointing towards the middle of the seat, the third input area is output as a third arrow pointing towards the bottom of the seat.

The touch display is configured to distinguish an activation mark and a deactivation mark by brightness or color of the first input area, the second input area, and the third input area.

The controller is configured to detect the selection input of the user by receiving a touch gesture for any one of the first input area, the second input area, and the third input area output to the touch display.

The controller is configured to detect the selection input of the user by receiving a swipe gesture for any one of the first input area, the second input area, and the third input area output to the touch display.

In accordance with another aspect of the disclosure, a control method of a vehicle for controlling an air conditioning device and an input device comprising a first input area and a second input area for outputting an activation mark or a deactivation mark by a selection input of a user, includes determining whether the air conditioning device is in an operating state; When the air conditioning device is in an operating state, in a state in which the activation mark of one of the first input area and the second input area is being output, changing the activation mark to the deactivation mark for a predetermined time when detecting the selection input for the one area of the user; and controlling to maintain the blowhole operation of the air conditioning device corresponding to the one area.

The input device further includes a third input area, and Wherein the controlling further comprises, when a selection input for an other area different from the one area among the first input area, the second input area and the third input area is detected within the predetermined time, controlling the other area to output the activation mark, stopping the blowhole operation of the air conditioning device corresponding to the one area and controlling to start the blowhole operation of the air conditioning device corresponding to the other area.

The input device further comprises a third input area, and wherein the controlling further includes: when a selection input for an other area different from the one area among the first input area, the second input area and the third input area is not detected from the user within the predetermined time, controlling the output of the one area to change from the deactivation mark to the activation mark.

The input device further includes a third input area, Wherein the air conditioning device comprises a first blowhole, a second blowhole and a third blowhole, and the first blowhole, the second blowhole, and the third blowhole are different in arrangement depending on the height of the inside of the vehicle.

The input device further includes a third input area, the first input area, the second input area and the third input area are provided by a first push button, a second push button and a third push button, respectively, and the first push button, the second push button and the third push button include a light emitter to output an activation mark or a deactivation mark.

The input device is a touch display, and the touch display is configured to provide an area in which the first input area and the second input area are divided.

The touch display further includes a third input area and outputs a side of a seat to a partial area on the screen of the touch display, and the first input area is output as a first arrow pointing towards the top of the seat, the second input area is output as a second arrow pointing towards the middle of the seat, the third input area is output as a third arrow pointing towards the bottom of the seat.

The touch display is configured to distinguish an activation mark and a deactivation mark by brightness or color of the first input area, the second input area, and the third input area.

The controlling includes: detecting the selection input of the user by receiving a touch gesture for any one of the first input area, the second input area, and the third input area output to the touch display.

The controlling includes: detecting the selection input of the user by receiving a swipe gesture for any one of the first input area, the second input area, and the third input area output to the touch display.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a flowchart illustrating a control method of a vehicle according to an exemplary embodiment.

DETAILED DESCRIPTION OF ILLUSTRATIVE EMBODIMENTS

Figure 1:
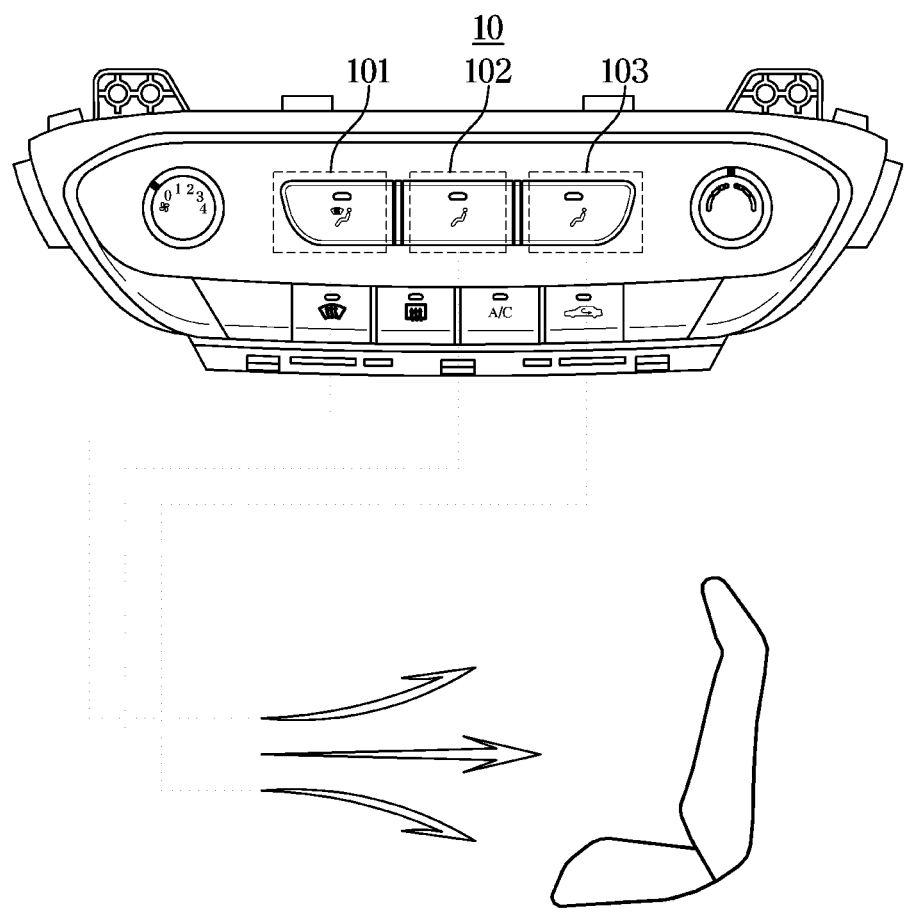
FIG. 1 is a view for explaining the prior art.

Like reference numerals refer to like elements throughout the specification. Not all elements of embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

Hereinafter, the operation principles and embodiments of the disclosure will be described with reference to the accompanying drawings.

Figure 2:
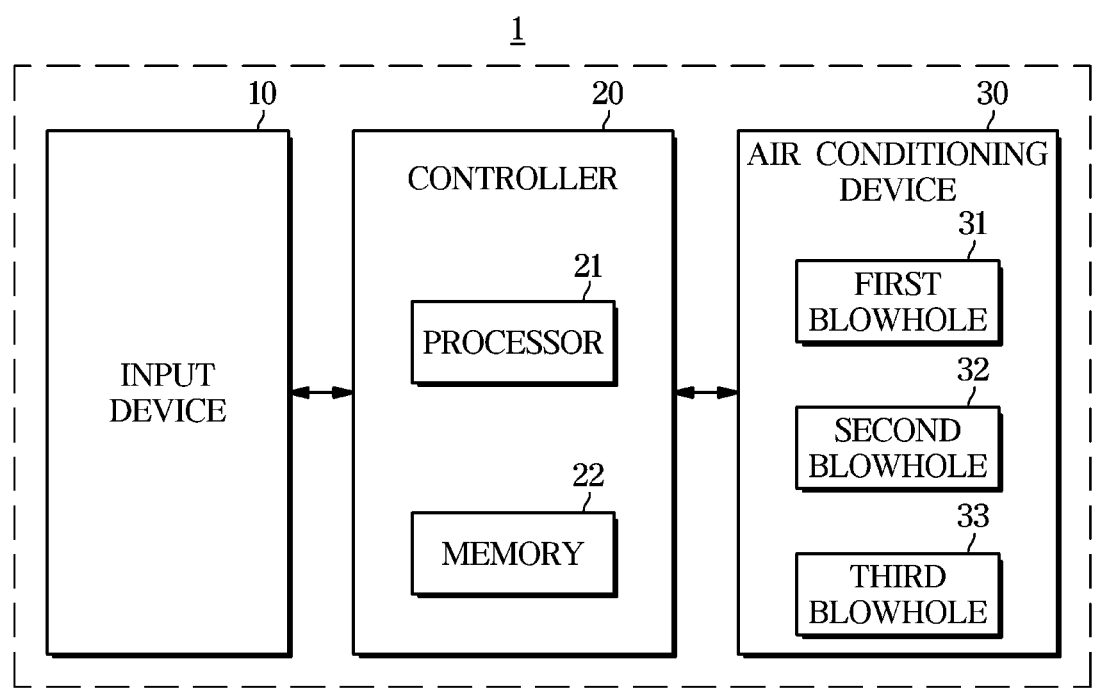
FIG. 2 is a control block diagram of a vehicle according to an exemplary embodiment.
Figure 3:
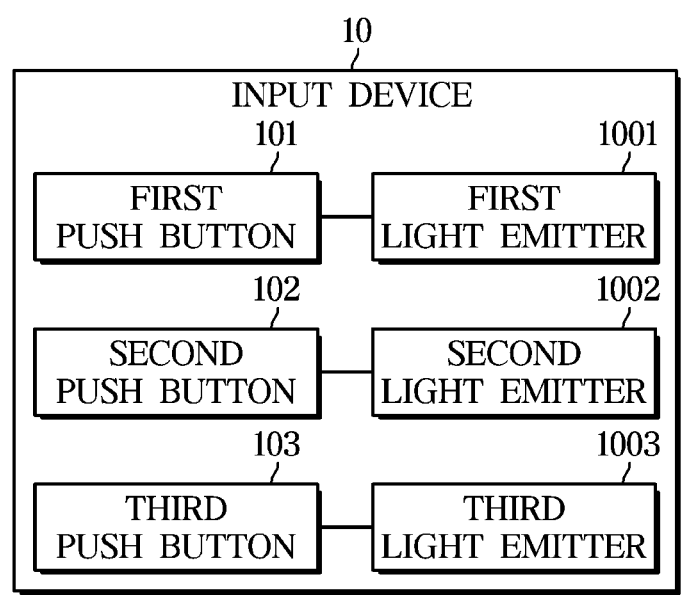
FIG. 3 illustrates a configuration of an input device referred to in FIG. 2.
Figure 4:
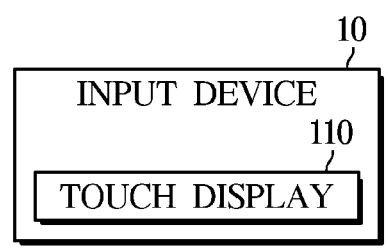
FIG. 4 illustrates a configuration according to another embodiment of input device referred to in FIG. 2.

FIG. 2 is a control block diagram of a vehicle according to an exemplary embodiment. FIG. 3 illustrates a configuration of an input device referred to in FIG. 2. FIG. 4 illustrates a configuration according to another embodiment of input device referred to in FIG. 2.

A vehicle 1 includes an input device 10 for receiving input relating to the operation and control of the air conditioning device 30 and indicating the status of an air conditioning device 30, a controller 20 generating a control signal according to the input received by the input device 10 and generating a control signal for controlling the input device 10 and the air conditioning device 30. The air conditioning device 30 is used for discharging cold or hot air into the vehicle 1.

The input device 10 may receive an input for controlling the air conditioning device 30 from a user. For example, the user's input may be an input that initiates the operation of the air conditioning device 30 or an input that changes the location of the blowing of the air conditioning device 30.

In detail, the input device 10 is divided into a first input area, a second input area, and a third input area so as to receive a user's selection input about a blowing position of the air conditioning device 30 from the user. In each input area, an activation mark or deactivation mark indicating an operating state of a blowhole corresponding to the input area may be output.

Referring to FIG. 3, the input device 10 includes a first push button 101, a second push button 102, and a third push button 103. The first push button 101 is provided with a first light emitter 1001, the second push button 102 is provided with a second light emitter 1002, the third push button 103 may be provided with a third light emitter 103. The first input area may be a first push button 101, the second input area may be a second push button 102, and the third input area may be a third push button 103. For example, the user may control the blow start or stop at the first blowhole 31 through an input to the first push button 101, control the blow start or stop blow at the second blowhole 32 through an input to the second push button 102, and control the blow start or stop at the third blowhole 33 through an input to the third push button 103. The light emitter provided in the push button may output an activation mark or deactivation mark of a blowhole corresponding to the push button. For example, the light emitter may be a light emitting diode, and refers to various light emitting devices capable of generating visual light.

On the other hand, the input device 10 may be provided in the vehicle 1 by various means. As described above, the input device 10 may provide an input area by a plurality of push buttons. As shown in FIG. 4, the input device 10 may be configured as a touch display 110 to output and provide an input area on the screen. The touch display 110 displays various information related to the vehicle 1 on the screen and provides various information to the user. The touch display 110 corresponds to input means for controlling various devices of the vehicle 1 through various input gestures.

In detail, the touch display 110 may be implemented as a liquid crystal display (LCD), a light emitting diode (LED), a plasma display panel (PDP), an organic light emitting diode (OLED), a cathode ray tube (CRT), or the like. The touch display 110 may include a display panel (not shown) for displaying an image and a touch screen panel (not shown) for receiving a gesture input of a user.

The input device 10 may be disposed at various positions among the interior of the vehicle 1. For example, the input device 10 may be installed in at least one places accessible by the user from the central panel area of the dashboard (not shown).

The controller 20 may control the output of the input device 10 and the operation of the air conditioning device 30 in response to the user's input to the input device 10. In detail, the controller 20 may output an activation mark and a deactivation mark by controlling on/off of the light emitter provided in the push button. When the input device 10 is the touch display 110, the controller 20 may control an image indicating the state of the air conditioning device 10 output on the screen to be changed. The controller 20 may control the output of activation marks or deactivation marks of the first input area, the second input area, and the third input area of the input device 10.

In addition, the controller 20 may generate a control signal for starting or terminating the operation of the air conditioning device 10 in response to an input to the user's input device 10, and may generate a control signal for changing the blowing position of the air discharged from the air conditioning device 10.

The controller 20 may include a memory 22 for storing programs and data for controlling operations of the input device 10, the air conditioning device 30, and the touch display 110, and a processor 21 for performing operations for controlling operations of the input device 10, the air conditioning device 30, and the touch display 110 according to the program and data stored in the memory 22. The memory 22 and the processor 21 of the controller 20 may be provided as separate chips or as a single chip.

The air conditioning device 30 is a device for providing cooling or heating of the vehicle 1. Specifically, the air conditioning device 30 includes an air conditioner (not shown) that cools the indoor air of the vehicle 1 and provides a cooling state, and a heater (not shown) that keeps the indoor air of the vehicle 1 warm.

The air conditioning device 30 may provide cooling or heating at various blowing positions through a plurality of blowholes installed inside the vehicle 1. To this end, the air conditioning device 30 may include a first blowhole 31, a second blowhole 32, and a third blowhole 33. For example, the first blowhole 31 is provided between the front window glass and the dashboard inside the vehicle to discharge cooling and heating air to the upper layer of the inside of the vehicle, the second blowhole 32 is provided at a height adjacent to the center panel area of the dash board (not shown) to discharge cooling and heating air to the middle layer inside the vehicle, and the third blowhole 33 may be provided at the bottom of the driver's seat or at the bottom of the passenger seat to discharge cooling and heating air to the lower layer of the inside of the vehicle. However, as described above, the air conditioning device 30 may have two blowholes in the seats of second row or more instead of first row of the vehicle 1.

In the above, the configuration of the vehicle for performing the control operation according to the disclosed invention has been described. Hereinafter, the output of the input device 10 by the control operation will be described in detail.

First, the controller 20 determines whether the air conditioning device 10 is operating. When the air conditioning device 10 discharges air only in one blowhole, even if the user inputs with the intention of stopping the blowing of the blowhole through which the air is currently discharged, the controller 20 controls the air discharge from the blowhole not to be stopped because the air conditioning device 10 must discharge air from at least one blowhole during operation. At this time, the input area corresponding to the blowhole is in principle not changed from the activation mark to the deactivation mark.

However, the user may be mistaken for the failure of the input device 10 or the air conditioning device 30 because of the above-described characteristics. Accordingly, the controller 20 determines that the air conditioning device 30 is operating and when the controller 20 detects a selection input of the one area of the user in a state in which an activation mark of one of the first input area, second input area and third input area of the input device 10 is being output, the controller 20 changes the activation mark to a deactivation mark for a predetermined time. However, the controller 20 controls to maintain the blowhole operation of the air conditioning device corresponding to the one area. Accordingly, the input device 10 may provide an output in which the user's intention is reflected while maintaining the necessary blowing of the air conditioning device 30. The predetermined time may be set by the user or may be a time stored when the vehicle is manufactured. For example, the predetermined time may be a time within 5 seconds, which is a time to expect another input of the user.

However, the controller 20 may control the display to be output according to the presence or absence of other input by the user within a predetermined time in order to display the correct operating state of the air conditioning device 30 on the input device 10.

According to an embodiment, when the controller 20 detects a user's selection input for a other area different from the one area of the first input area, the second input area, and the third input area within a predetermined time, the controller 20 controls the display of output for other area to be changed from the deactivation mark to the activation mark, stops the blowhole operation of the air conditioning device 10 corresponding to the one area, and control to start the blowhole operation of the air conditioning device 10 corresponding to the other area. This is because air discharge from the blowhole corresponding to the other area is secured.

According to another embodiment of the present disclosure, when a selection input for an other area different from an one area where the activation mark is being output among the first input area, the second input area and the third input area is not detected within a predetermined time, the controller 20 may control the output of the one area to change from deactivation mark to activation mark. This is because, when the air conditioning device 10 is in operation, the air conditioning device 10 must discharge air from at least one blowhole.

The above-described embodiments are applicable to the case in which the input device 10 is composed of a plurality of push buttons as well as the case of the touch display 110. Hereinafter, the above embodiments will be described in detail on the screen of the touch display 110.

Figure 5:
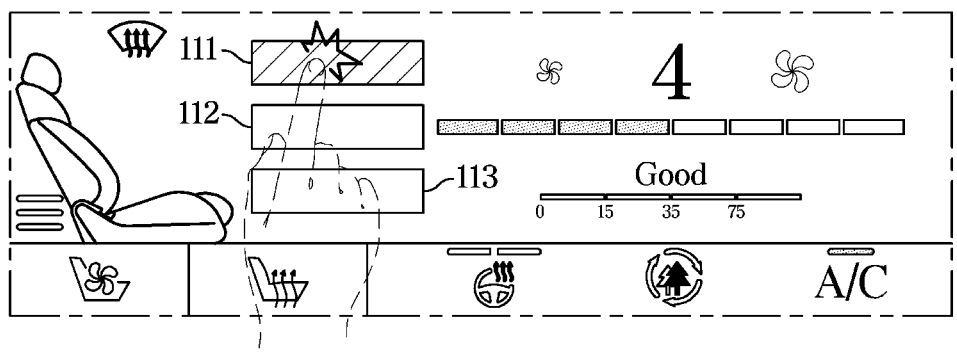
FIGS. 5 and 6 are views for explaining a gesture performed on a touch display.
Figure 5:
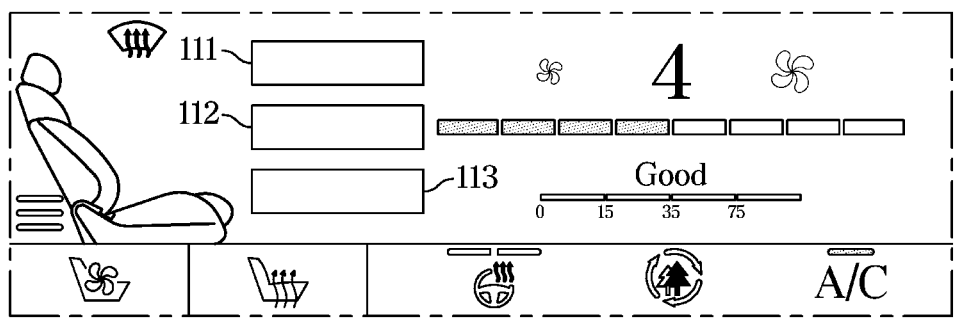
Figure 5:
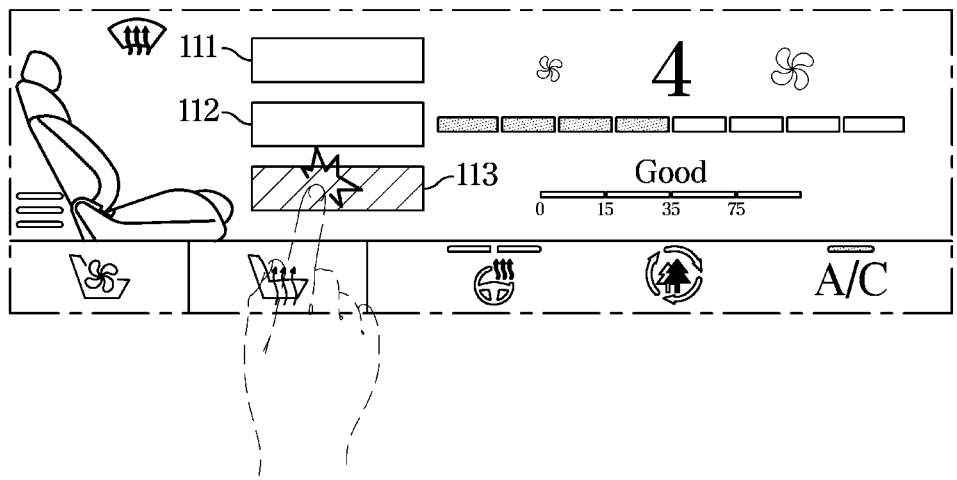
Figure 6:
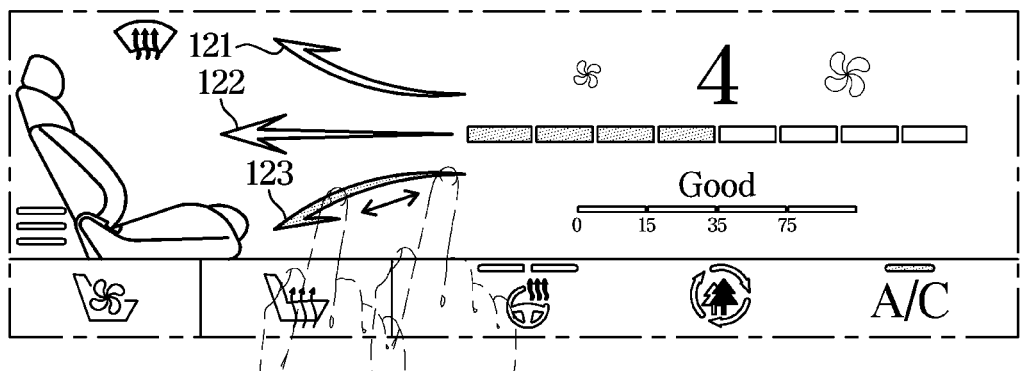
Figure 6:
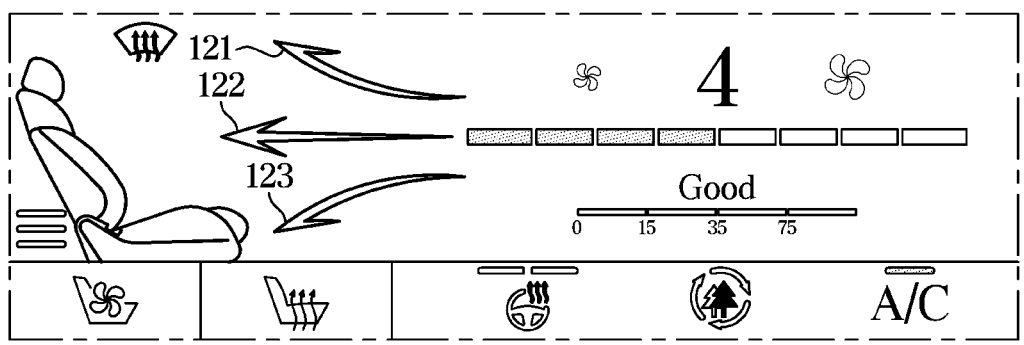
Figure 6:
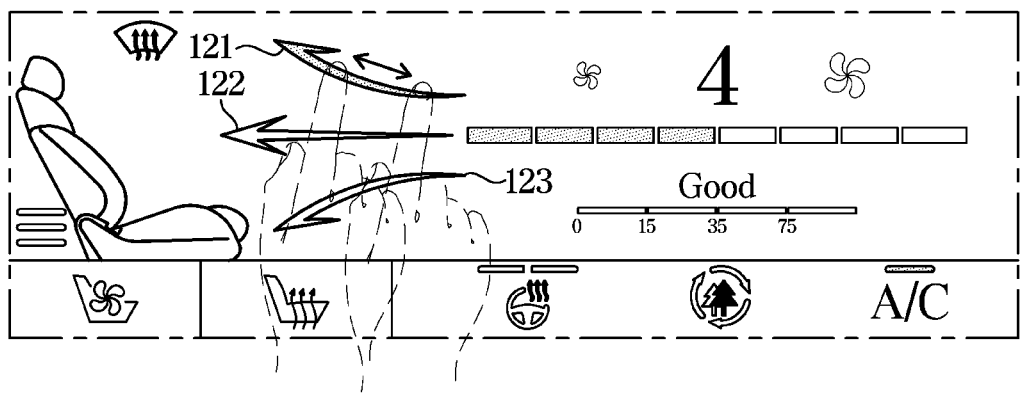

FIGS. 5 and 6 are views for explaining a gesture performed on a touch display.

A first input area, a second input area, and a third input area, which are a plurality of areas for controlling the blowing position of the air conditioning device, may be output on the screen of the touch display 110. In addition, a vehicle sheet may be output to a area adjacent to the plurality of input area in a portion of the screen of the touch display 110, and an image may be output so that a user may recognize the position of the blower.

For example, referring to FIG. 5, a first touch area 111, a second touch area 112, and a third touch area 113 may be output on a screen of the touch display 110. In this case, the user may control the start and stop of the first blowhole 31, the second blowhole 32, and the third blowhole 33 of the air conditioning device 30 through touch gestures on the first touch area 111, the second touch area 112, and the third touch area 113. In this case, the first touch area in, the second touch area 112, and the third touch area 113 may output an activation mark or a deactivation mark by color, brightness, or contrast according to the state of each blowhole.

According to an embodiment of the present disclosure, the controller 20 may receive and detect a touch gesture for any one of a first input area, a second input area, and a third input area output on the touch display 110. In this case, the first input area, the second input area, and the third input area correspond to the first touch area in, the second touch area 112, and the third touch area 113, respectively.

For another example, referring to FIG. 6, a first arrow 121, a second arrow 122, and a third arrow 123 may be output on the screen of the touch display 110. For example, the side of the seat is output on a portion of the screen of the touch display 110, the first input area is output to the first arrow 121 pointing towards the top of the seat, the second input area is output to the second arrow 122 pointing towards the middle of the seat, and the third input area is output to a third arrow 123 pointing towards the bottom of the seat. In this case, the user may control the start and stop of the first blowhole 31, the second blowhole 32, and the third blowhole 33 of the air conditioning device 30 through the swipe gestures for first arrow 121, second arrow 122, and third arrow 123. For example, the user may control the blowhole operation through a swipe gesture pointing towards the head of the arrow, and may control the blowhole stop through a swipe gesture pointing away from the head of the arrow. In other example, the user may change the current operating state of the blowhole by swipe gestures pointing towards the head of the arrow or opposite to the head. In another example, the user may change the current operating state of the blowhole by using an arrow or a touch gesture on an area adjacent to the arrow.

FIG. 7 is a flowchart illustrating a control method of a vehicle according to an exemplary embodiment. However, this is only a preferred embodiment for implementing the present invention. Of course, some steps may be added or deleted as necessary.

The controller 20 determines whether the air conditioning device is in operation (701), In order to determine whether only one blowhole of the air conditioning device is in operation, the controller 20 determines whether an activation mark is output to only one area of the first input area, the second input area, and the third input area (702).

While the activation mark is output to only one area, the controller 20 receives a user's selection input for the one area (703). At this time, in response to receiving the selection input, the controller 20 controls the activation mark of the one area to be changed to the deactivation mark for a predetermined time or less (704). Even at this time, the blowhole corresponding to one area of the air conditioning device is in an operating state.

While the deactivation mark is being output, the controller 20 determines whether there is a selection input for another area different from the one area within a predetermined time (705).

When the controller 20 detects a selection input for the other area, the controller 20 changes the activation mark for the one area to a deactivation mark and changes the other area to an activation mark (706). At this time, the operation of the blowhole corresponding to the one area of the air conditioning device is stopped, and operation of the blowhole corresponding to the other area is started.

When a selection input for the other area is not detected, the controller 20 changes the deactivation mark of the one area to an activation mark (707). At this time, the blowhole corresponding to one area of the air conditioning device is maintained in an operating state.

According to one aspect of the disclosed invention can eliminate misunderstanding of the failure of the input device for controlling the air conditioning device, and allows the user to operate intuitively and conveniently.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
   an air conditioner located inside the vehicle;
   an input for the air conditioner located inside the vehicle and provided to receive a selection input of a user with respect to a blowing position of the air conditioner, wherein the input comprises a first input area, a second input area and a third input area for outputting an activation mark or a deactivation mark by the selection input; and
   a controller configured to control output of the activation mark or the deactivation mark of the first input area and the second input area, wherein, in a state in which the air conditioner is in an operating state and the activation mark of one area of the first input area and the second input area is being output, the controller is configured to change the activation mark to the deactivation mark for a predetermined time when detecting the selection input for the one area and to control to maintain blowhole operation of the air conditioner corresponding to the one area, and
   wherein, when the selection input of the user for another area different from the one area among the first input area, the second input area and the third input area is not detected within the predetermined time, the controller is configured to control the output of the one area to change from the deactivation mark to the activation mark.

2. The vehicle according to claim 1, wherein, when the selection input for the other area different from the one area among the first input area, the second input area and the third input area is detected within the predetermined time, the controller is configured to control the other area to output the activation mark, to stop the blowhole operation of the air conditioner corresponding to the one area and to control to start the blowhole operation of the air conditioner corresponding to the other area.

3. The vehicle according to claim 1, wherein the air conditioner comprises a first blowhole, a second blowhole and a third blowhole, the first blowhole, the second blowhole, and the third blowhole being different in arrangement depending on a height of an inside of the vehicle.

4. The vehicle according to claim 1,
   wherein the first input area, the second input area and the third input area are provided by a first push button, a second push button and a third push button, respectively, and
   wherein the first push button, the second push button and the third push button include a light emitter to output the activation mark or the deactivation mark.

5. The vehicle according to claim 1, wherein the input is a touch display that provides an area in which the first input area and the second input area are divided.

6. The vehicle according to claim 5,
   wherein the touch display further comprises the third input area and outputs a side of a seat to a partial area on a screen of the touch display, and
   wherein the first input area is output as a first arrow pointing towards a top of the seat, the second input area is output as a second arrow pointing towards a middle of the seat, and the third input area is output as a third arrow pointing towards a bottom of the seat.

7. The vehicle according to claim 6, wherein the touch display is configured to distinguish the activation mark and the deactivation mark by brightness or color of the first input area, the second input area, and the third input area.

8. The vehicle according to claim 6, wherein the controller is configured to detect the selection input of the user by receiving a touch gesture for any one of the first input area, the second input area, or the third input area, the touch gesture being output to the touch display.

9. The vehicle according to claim 1, wherein the controller is configured to detect the selection input of the user by receiving a swipe gesture for any one of the first input area or the second input area.

10. A method for controlling an air conditioner of a vehicle using an input that comprises a first input area, a second input area and a third input area for outputting an activation mark or a deactivation mark by a selection input of a user, the method comprising:
    determining whether the air conditioner is in an operating state;
    when the air conditioner is in the operating state and when the input is in a state in which the activation mark of one area of the first input area and the second input area is being output, changing the activation mark to the deactivation mark for a predetermined time when detecting the selection input for the one area;
    controlling the air conditioner to maintain blowhole operation of the air conditioner corresponding to the one area; and
    controlling the output of the one area to change from the deactivation mark to the activation mark when the selection input of the user for another area different from the one area among the first input area, the second input area and the third input area is not detected within the predetermined time.

11. The method according to claim 10, wherein when the selection input for the other area different from the one area among the first input area, the second input area and the third input area is detected within the predetermined time,
    controlling the other area to output the activation mark, stopping the blowhole operation of the air conditioner corresponding to the one area and controlling to start the blowhole operation of the air conditioner corresponding to the other area.

12. The method according to claim 10, wherein the air conditioner comprises a first blowhole, a second blowhole and a third blowhole, the first blowhole, the second blowhole and the third blowhole being different in arrangement depending on a height of an inside of the vehicle.

13. The method according to claim 10,
    wherein the first input area, the second input area and the third input area are provided by a first push button, a second push button and a third push button, respectively, and
    wherein the first push button, the second push button and the third push button include a light emitter to output the activation mark or the deactivation mark.

14. The method according to claim 10, wherein the input is a touch display that provides an area in which the first input area and the second input area are divided.

15. The method according to claim 14, wherein the touch display further comprises the third input area and outputs a side of a seat to a partial area on a screen of the touch display, and wherein the first input area is output as a first arrow pointing towards a top of the seat, the second input area is output as a second arrow pointing towards a middle of the seat, and the third input area is output as a third arrow pointing towards a bottom of the seat.

16. The method according to claim 15, wherein the touch display is configured to distinguish the activation mark and the deactivation mark by brightness or color of the first input area, the second input area, and the third input area.

17. The method according to claim 15, wherein controlling comprises detecting the selection input of the user by receiving a touch gesture for any one of the first input area, the second input area, and the third input area, the touch gesture being output to the touch display.

18. The method according to claim 10, wherein controlling comprises detecting the selection input of the user by receiving a swipe gesture for the first input area or the second input area.

19. A vehicle comprising:
an air conditioner located inside the vehicle;
an input for the air conditioner located inside the vehicle, the input configured to receive a selection from a user with respect to a blowing position of the air conditioner, wherein the input comprises a first input area, a second input area and a third input area for turning on an activation mark or a deactivation mark by the selection; and
a controller configured to turn on the activation mark and the deactivation mark of the first input area or the second input area,
wherein, when the air conditioner is in an operating state and when the activation mark of one area of the first input area and the second input area is turned on, the controller is configured to change the activation mark to the deactivation mark for a predetermined time when detecting the selection for the one area and to maintain blowhole operation of the air conditioner corresponding to the one area, and
wherein, when the selection from the user for another area different from the one area among the first input area, the second input area and the third input area is not detected within the predetermined time, the controller is configured to control an output of the one area to change from the deactivation mark to the activation mark.

20. The vehicle according to claim 19,
wherein the first input area, the second input area and the third input area are provided by a first push button, a second push button and a third push button, respectively, and
wherein the first push button, the second push button and the third push button include a light emitter to output the activation mark or the deactivation mark.

* * * * *